Aug. 13, 1957     A. F. BOHNHOFF ET AL     2,802,354
COUPLING
Filed Dec. 6, 1954
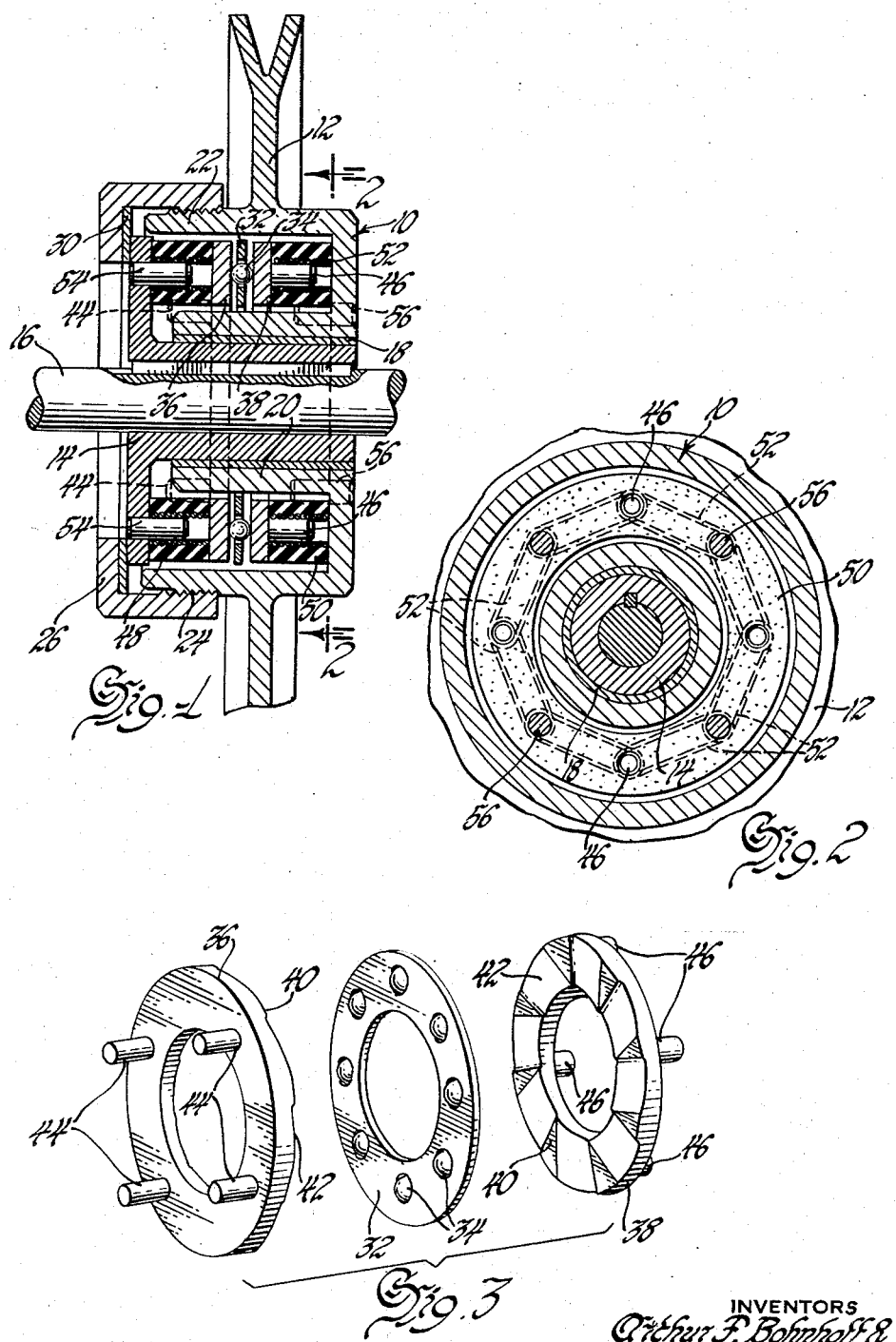
INVENTORS
Arthur F. Bohnhoff &
BY Paul V. Wysong Jr.
ATTORNEY

United States Patent Office 2,802,354
Patented Aug. 13, 1957

2,802,354

COUPLING

Arthur F. Bohnhoff and Paul V. Wysong, Jr., Saginaw, Mich., assignors to General Motors Corporation, Detroit, Mich., a corporation of Delaware Application December 6, 1954, Serial No. 473,326

13 Claims. (Cl. 64—29)

This invention concerns a coupling for driving and driven means, characterized in that when the load on the driven means exceeds a predetermined value the coupling becomes disengaged so that the driving means idles or free wheels until the load is reduced to or below such value.

While various applications exist for such a coupling and while the coupling herein is of general utility, it was particularly developed as a safety clutch for use in mechanical power steering. As so applied, the coupling becomes disengaged whenever the resistance to steering becomes abnormal, as when one of the dirigible wheels is being turned against a high curb, for example. In this way, damage to the steering linkage and other steering parts which might otherwise occur is prevented.

The present invention has as its principal object to provide an effective coupling of the type indicated which is of simple and inexpensive design.

Another object is to provide a coupling which is adapted for the particular purpose above mentioned, also for other applications.

Still another object is to provide such a coupling, having inherent damping characteristics.

A further object is to provide a coupling comprising means for adjusting the coupling parts so as to increase or decrease the load required to break the connection.

Still other objects and features of the invention will be apparent from the following specific description of a preferred embodiment thereof. The description will proceed with reference to accompanying drawings wherein:

Fig. 1 is a transverse section through the coupling;

Fig. 2 is a section on the line 2—2 of Fig. 1; and

Fig. 3 is an exploded perspective view of the principal parts of the coupling.

Referring first to Fig. 1, the numeral 10 indicates the driving member, which will be seen as having a pulley 12 integral therewith, the pulley being adapted to receive a V-belt. The member 10 is spaced from the journal portion of a flange carrying member 14, keyed to the driven shaft 16, by a bushing 18. In addition to a hub portion 20, member 10 includes an outer concentric cylindrical portion 22 which is threaded at 24 to receive an adjusting ring 26, the purpose of which will later appear. This ring exerts its force on the flange member 14 through a bearing 30.

Surrounding the hub 20 is a bearing ring 32 carrying a plurality of balls 34, while at either side of the bearing is a plate 36, 38 having an inner face providing a series of rises and falls 40, 42 respectively. Each plate 36, 38 has extending from the back face thereof a plurality of pins 44, 46 respectively. These pins are received in apertures formed in resilient elements or pads 48, 50 respectively (Figs. 1 and 2). Such elements may be fabricated of rubber or any other suitable elastomeric or rubber-like material. In the preferred construction illustrated, each has embedded therein about the apertures receiving the pins, a plurality of endless loops of reinforcing cord 52. Most suitably, nylon is used as the cord material.

In addition to the pins 44, 46 the coupling comprises pins 54, 56 extending, respectively, from the flange or driven member 14 and the driving member 10.

With the arrangement as described and illustrated, it should be apparent that whenever the load on the driven shaft 16 exceeds a predetermined value the connection between the plates 36 and 38, via the balls 34, will be broken, this action being marked by compression of the resilient elements 48, 50 in the plane of their thickness or width. It should be equally apparent that once the load is reduced to or below the predetermined value the resilient elements will expand restoring the connection.

Should it be desirable to pre-compress or further pre-compress the resilient elements to the end of increasing the load required to break the connection between the plates, this can be readily accomplished by means of the threaded ring 26.

The cord loops 52 as so related to the pins provide positive driving connections serving to substantially preclude the lost motion which would otherwise obtain because of the compressibility of the resilient elements.

Having thus described and illustrated our invention, what we claim is:

1. In a coupling for driving and driven means, a pair of opposed plates formed to provide a partable driving connection therebetween, yieldable means associated with each plate tending to maintain said driving connection, said means including resilient elements formed to accommodate projections extending from the plates, means interconnecting one of said plates and said driven means, and means interconnecting the other of said plates and said driving means, these interconnections being effected through said elements, said coupling being characterized in operation in that on the application of power to said driving means said yieldable means yields when said driven means is under a predetermined load, allowing said plates to part so that said driving means is permitted to move relative to said driven means.

2. In a coupling for driving and driven means, a pair of opposed plates formed to provide a partable driving connection therebetween, yieldable means in the form of a resilient element disposed between the outer face of one of said plates and said driven means, means interconnecting the said plate and said driven means through said element, similar yieldable means disposed between the outer face of the other of said plates and said driving means, and means interconnecting the said other of said plates and said driving means through the corresponding resilient element, said coupling being characterized in operation in that on the application of power to said driving means said yieldable means yields when said driven means is under a predetermined load, allowing said plates to part so that said driving means is permitted to move relative to said driven means.

3. In a coupling for driving and driven means, a pair of plates in face to face relation, the inner face of each of said plates being formed to provide a series of rises and falls whereby a partable driving connection between the plates is obtained, yieldable means in the form of a resilient annular pad disposed between the outer face of one of said plates and said driven means, means interconnecting the said plate and said driven means through said pad, similar yieldable means disposed between the outer face of the other of said plates and said driving means, and means interconnecting the said other of said plates and said driving means through the corresponding resilient pad, said coupling being characterized in operation in that on the application of power to said driving means said yieldable means yields when said driven means is under a predetermined load, allowing said plates to part so that said driving means is permitted to move relative to said driven means.

4. In a coupling for driving and driven means, a pair of plates in face to face relation, the inner faces of said plates being formed to provide complementary series of rises and falls, a bearing positioned between said plates including anti-friction elements adapted for accommodation in the recesses represented by said falls, yieldable means in the form of a resilient annular pad disposed between and against the outer face of one of said plates and said driven means, means interconnecting the said plate and said driven means through said pad, similar yieldable means disposed between and aaginst the outer face of the other of said plates and said driving means, and means interconnecting the last-mentioned plate and said driving means through the corresponding resilient pad, said coupling being characterized in operation in that on the application of power to said driving means said yieldable means yields when said driven means is under a predetermined load, breaking the connection of said plates through said bearing so that said driving means is permitted to move relative to said driven means.

5. In a coupling for driving and driven means, a pair of plates in face to face relation, the inner faces of said plates being formed to provide complementary series of rises and falls, a bearing positioned between said plates including anti-friction elements adapted for accommodation in the recesses represented by said falls, a member formed of an elastomeric material disposed between and against the outer face of one of said plates and said driven means, means interconnecting the said plate and said driven means through said member, a second such member disposed between and against the outer face of the other of said plates and said driving means, and means interconnecting the last-mentioned plate and said driving means through said second member, said coupling being characterized in operation in that on the application of power to said driving means said members yield by compression thereof when said driven means is under a predetermined load, breaking the connection of said plates through said bearing so that said driving means is permitted to move relative to said driven means.

6. A coupling conforming to claim 5 comprising means for precompressing said members so as to increase the load required to break the connection between said plates.

7. In a coupling for driving and driven means, a pair of opposed plates formed to provide a partable driving connection therebetween, yieldable means associated with each plate tending to maintain said driving connection, said means including resilient pads formed to accommodate projections extending from the plates, means interconnecting one of said plates and said driven means, means interconnecting the other of said plates and said driving means, these interconnections being effected through said pads, and compression means for increasing or decreasing the resistance represented by said yieldable means, said coupling being characterized in operation in that on the application of power to said driving means said yieldable means yields when said driven means is under a predetermined load, allowing said plates to part so that said driving means is permitted to move relative to said driven means.

8. In a coupling for driving and driven means, a pair of plates in face to face relation, the inner face of said plates being formed to provide complementary series of rises and falls, an annular bearing element positioned between said plates including a plurality of balls adapted for accommodation in the recesses represented by said falls, a member formed of an elastomeric material disposed between and against the outer face of one of said plates and said driven means, said member having embedded therein a plurality of endless loops of reinforcing cord, pin means interconnecting the said plate and said driven means through said cord loops, a second such member disposed between and against the outer face of the other of said plates and said driving means, and pin means interconnecting the last-mentioned plate and said driving means through the cord loops embedded in the said second member, said coupling being characterized in operation in that on the application of power to said driving means said members yield by compression thereof when said driven means is under a predetermined load, breaking the connection of said plates through said bearing so that said driving means is permitted to move relative to said driven means.

9. A coupling conforming to claim 8 including a collar having a threaded connection with said driving means and bearing against said driven means, said collar being adjustable to pre-compress said members so as to increase the load required to break the driving connection between said plates.

10. In a coupling for driving and driven means, a pair of plates in face to face relation, the inner face of said plates being formed to provide complementary series of rises and falls, an annular bearing element positioned between said plates including a plurality of balls adapted for accommodation in the recesses represented by said falls, a member formed of an elastomeric material disposed between and against the outer face of one of said plates and said driven means, said member having embedded therein a plurality of sets of endless loops fabricated of reinforcing cord, pin means interconnecting the said plate and said driven means through said cord loops, a second such member disposed between and against the outer face of the other of said plates and said driving means, and pin means interconnecting the last-mentioned plate and said driving means through the sets of cord loops embedded in the said second member, said coupling being characterized in operation in that on the application of power to said driving means said members yield by compression thereof when said driven means is under a predetermined load, breaking the conneotion of said plates through said bearing so that said driving means is permitted to move relative to said driven means.

11. A coupling conforming to claim 10 including a collar having a threaded connection with said driving means and bearing against said driven means, said collar being adjustable to pre-compress said members so as to increase the load required to break the driving connection between said plates.

12. In a coupling for driving and driven means, a pair of opposed members formed to provide a partable driving connection therebetween, yieldable means associated with each member tending to maintain said driving connection, said means including a pair of resilient pads, means interconnecting one of said members and said driven means and means interconnecting the other of said members and said driving means, these interconnections being effected through said pads, said coupling being characterized in operation in that on the application of power to said driving means said yieldable means yields when said driven means is under a predetermined load, allowing said members to part so that said driving means is permitted to move relative to said driven means.

13. A coupling according to claim 12 which comprises means whereby said pads may be placed under compression to increase the load the coupling will withstand before parting.

References Cited in the file of this patent

UNITED STATES PATENTS

| 2,560,427 | Foss | July 10, 1951 |
| 2,683,362 | Bowman | July 13, 1954 |

FOREIGN PATENTS

| 110,543 | Switzerland | June 16, 1925 |